Jan. 2, 1951

L. G. DIMITRI ET AL 2,536,428

SELF-CLOSING VALVE

Filed April 15, 1947

Lionel G. Dimitri
Samuel A. Purvis
INVENTORS

BY

ATTORNEY

Jan. 2, 1951  L. G. DIMITRI ET AL  2,536,428
SELF-CLOSING VALVE

Filed April 15, 1947  3 Sheets-Sheet 2

LIONEL G. DIMITRI
SAMUEL A. PURVIS
INVENTORS

BY
ATTORNEY

Jan. 2, 1951 L. G. DIMITRI ET AL 2,536,428
SELF-CLOSING VALVE

Filed April 15, 1947 3 Sheets-Sheet 3

Lionel G. Dimitri
Samuel A. Purvis
INVENTORS

BY
ATTORNEY

Patented Jan. 2, 1951

2,536,428

UNITED STATES PATENT OFFICE 2,536,428

SELF-CLOSING VALVE

Lionel G. Dimitri and Samuel A. Purvis, Montreal, Quebec, Canada, assignors to L'Air Liquide, Societe Anonyme pour L'Etude et L'Exploitation des Procedes Georges Claude, Paris, France Application April 15, 1947, Serial No. 741,624
In Canada March 14, 1947

5 Claims. (Cl. 222—3)

Introduction

This invention relates to valves of the self-closing variety and more particularly to a self-closing valve designed to handle high pressure liquids, vapours or gases.

Valves used commercially to control the flow of liquids, gases or vapours from piping, containers, or vessels, fall into one class, namely the hand-operated type having an inlet and outlet, a closing plug which interrupts the flow between these two ports, and a valve stem having a handle which is adapted to control the positioning of the closing plug in relationship to the two ports.

Conventionally the stem is threaded so that rotary motion of the handle moves the valve plug away from the intake port allowing the gas, vapour or liquid free passage to the outlet port. In controlling the flow of gases, vapours or liquids under pressure, the return or closing motion of the plug must overcome the pressure of the gas, which builds up abnormally on the face of the plug and screw threads of the stem making the valve handle very difficult to turn. The diaphragm type of valves are equally affected by pressure and are difficult to seat against pressure. Due to regulations which many industries must adhere to, the present valve handwheel is limited to size and diameter. This limited handwheel size plus the fact that they are closing against the pressure contained in the vessels, makes valve operation difficult.

Another disadvantage of the conventional types of valve now in everyday use, is the many moving parts necessary, making the valve high in cost, difficult to service and prone to wear, thus greatly shortening the life of the valve.

In many industries where valves are secured into containers or vessels, a protecting cover is required. The present type of valve requires a removable cover for filling or discharging. The continual removing and replacing of this cover necessitates much time, and causes damage to the valve outlet threads.

The design of the conventional valve, having the stem centrally located, necessitates side location for safety plugs, etc. This side location of the safety members, when the valve is used with oxygen cylinders or the like, causes the cylinder to spin or fall over if the plug is blown. This presents a great hazard in the case of inflammable gases, as fire would quickly spread to other cylinders knocked over or in the close vicinity of the damaged one.

Objects

Objects of this invention are:

1. A quick-acting, self-closing valve having the following:

A. The elimination of moving parts, the applicants' valve having only two moving parts.

B. The overcoming of the pressure factor to the extent of using the pressure factor to act as a seal against itself.

C. The elimination of the handwheel, screw stem and stuffing box do away with the most likely points which develop leaks due to wear.

D. Providing a valve opening means with which only a fraction of a turn is necessary from closed to full open position, and means associated with the opening means for obtaining many times greater turning force than provided with the conventional handwheel type valve.

E. Providing safety members which are built into the top of the valve, thus directing released pressure, and in case of fire, flame in an upward direction instead of against adjoining cylinders.

F. Providing a valve over which a protecting cover, required in some industries, may be semi-permanently attached and through which charging and discharging may be accomplished without removal of the cover.

G. Providing a valve, which through simplicity of design, makes the valve easy to machine and manufacture and of lighter weight, thus saving on cost of the valve and shipping charges.

Preferred structure

With these and other objects in view, a preferred structure embodying the invention consists of a valve designed to control the flow of high pressure gas from a vessel, such as an oxygen cylinder.

The valve consists of a body having inlet and outlet ports, the inlet port being a longitudinal passage and the outlet being a passage at substantially right angles, both passages passing completely through the body. A floating valve body is spring urged against a shoulder in the outlet passage and an extension of the body extends axially beyond the shoulder and is adapted to be engaged and free from the shoulder by the connecting component of the medium for carrying the gas after discharge. A collar threadably engaging the casing housing the outlet port is adapted to draw the connecting component into engagement with the valve body extension, to unseat the body.

Detailed description

The invention consists in the novel construction, adaptation, and combination of parts as described in detail with reference to the accompanying drawings, in which.

Figure 1:
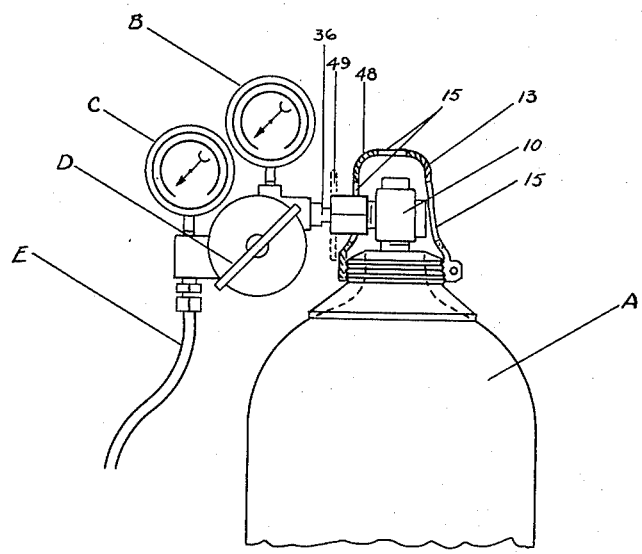
Figure 1 illustrates an adaptation of the valve, controlling the flow of gas from a high pressure oxygen cylinder through a pressure gauge assembly.

With reference to the drawings, Figure 1 illustrates the arc of the valve in conjunction with an oxygen cylinder A and a pressure gauge assembly consisting of a high pressure gauge B, a low pressure gauge C, the pressure control D and the tube E connecting the supply to its place of use. The body of the valve 10 is threadedly connected to the outlet of the cylinder A, and a cover piece 13 protects the valve 10 from damage in shipping or use. The openings 15 in the cover 13 allow access to the valve to connect a component connection which, in the preferred structure illustrated is the gauge assembly, as well as passage to the open in the event of the safety blowing, and field maintenance to the valve.

In the following drawings, 10 designates the body or valve housing, having a passage 12 passing longitudinally through the body. A second passage 14 connects with and crosses the first passage 12 at substantially right angles. Three enlargements 16, 18 and 20 of the secondary passages 14 form annular shoulders 17, 19 and 21.

A valve body 22 is slidably mounted in the passage 14. A shoulder portion 24, formed by an annular collar on the body 22, is recessed to accommodate an annular packing 26, and the sliding motion of the body is adapted to be stopped in one direction by the packing 26 contacting an annular rim 28 extending from the shoulder 19 on the valve body 10, the seating of this packing 26 on the rim 28 closes the passage between the enlargement 18 and 16 of the passage 14. The face of the body shoulder portion 24 opposite from the packing 26 is adapted to seat a spring 30, the said spring being adapted to urge the seating of the body packing 26 against the annular body rim 28. A threaded plug or closure 32 is adapted to close the end of the passage 14 by being threadably engaged to the body 10 within the enlargement 20. A packing 33 clamped between the shoulder 21 and the plug 32 prevents leakage between the body 10 and the plug 32. The closure 32 is adapted to seat the spring 30, and the outside face is adapted to be engaged by a wrench or other turning medium.

The design of the valve makes the maintenance and repair a simple operation. By simply removing the closure 32 all parts of the valve may be removed.

At the outlet end of the valve the passage 14 is enlarged at 34 to provide suitable entry for the component connection 36. Different standard connections are in use and some are illustrated and will be detailed later. However, the connection herein detailed is for explanatory purposes and is not expected to limit the features of the valve.

The nozzle of the component connection 36 is collared at 38, providing a seat 40 on the leading side of the collar for a packing 42. The offside face 44 of the collar 38 is adapted to be engaged by the flanged portion 46 of a threaded connecting collar 48, said connecting collar being adapted to threadably engage an extension 50 of the body 10 housing the outlet port.

Figures 3, 4:
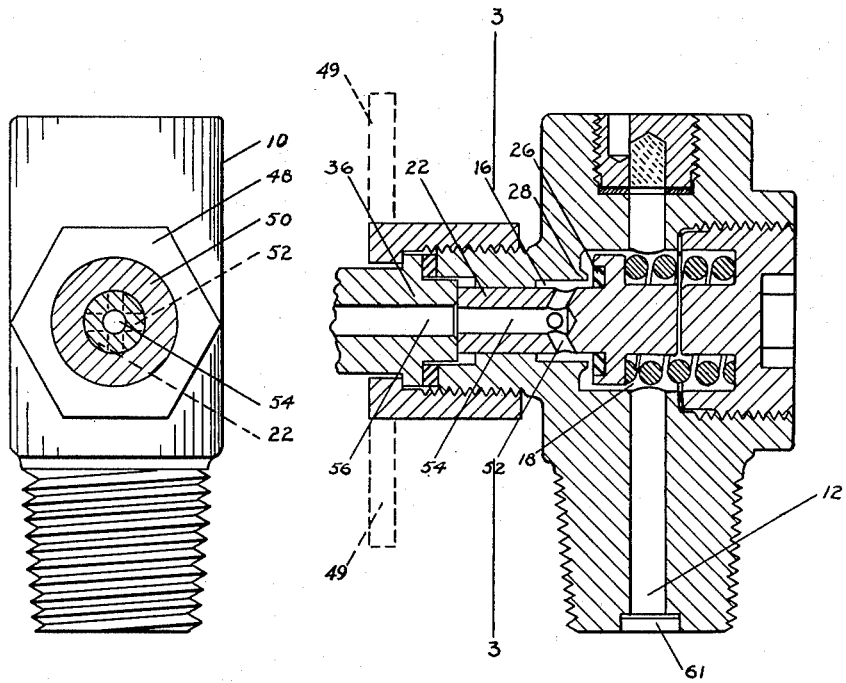
Figure 3 shows a vertical front elevation of the valve, partly in section, the section being taken on the line 3—3, Figure 4.
Figure 4 shows a vertical section of the valve in the open position.

Figure 4 illustrates the valve in the open position and the passage of the gas in discharging it from its source through the primary passage 12 into the spring chamber 18 formed by the second enlargement between the clapet packing 26 and the rim 28 into the chamber 16 formed by the first enlargement. From this chamber 16 the gas passes through joining passages 52 entering a centrally disposed passage 54 in the body of the valve body 22. The passage 54 penetrates only a portion of the length of the clapet 22 and the aforementioned joining passages 52 complete the through passage to the outside periphery of the body. The gas is then carried by the passage 56 of the component connection 36 which is butting up against the passage 54 in the body 22. In the case of charging cylinders or containers of any type the flow of gas is reversed, entering the clapet passage 54 and passing out through the primary passage 12. In the preferred structure so far described, the safety devices required in handling high pressure gases, liquids, or vapours are located in line with the primary passage 12 and consists of a safety plug 58 threadably connected to the valve body 10 and a second disc-like safety member 59, held in place against a gasket by the first safety device. In the entrance to the primary passage 12, provision is made for a filter 61 to be attached. The filter is adapted to prevent any scale or solids in the gas, vapour, or liquid from passing into the valve.

Figures 5, 6:
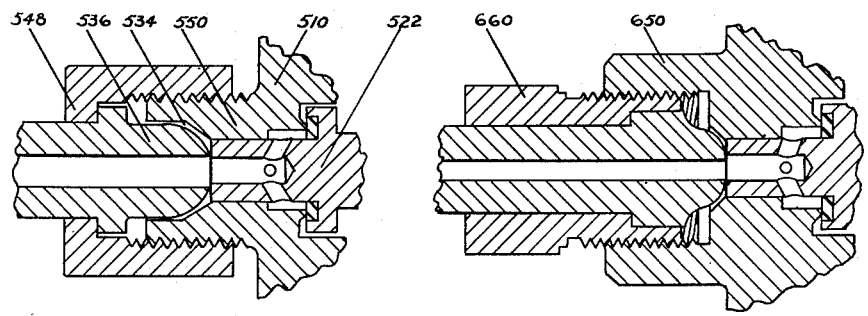
Figure 5 is a part section of the valve, showing the adaptation of the outlet port to American standard connections.
Figure 6 is a part section of the valve showing the adaptation of the outlet port to European standard connections.

Figure 5 shows an alternative structure of the enlargement 534 in the extension 550 which is designed to accommodate the American standard of component connection 536. The American standard comprises a substantially rounded nozzle rather than the square shouldered connection shown in Figures 2 and 4.

Figure 6 shows another alternative construction of the outlet port, designed to accommodate the European standard of connection. The threaded collar 660 corresponding to 548 on the previous illustration is externally threaded and the threads on the extension 650 of the valve housing 610 are internal. However, it will be understood that the variations of the component connection, and the resultant modifications to the valve housing to accommodate these variations do not effect the operation of the valve body 722.

Figure 7:
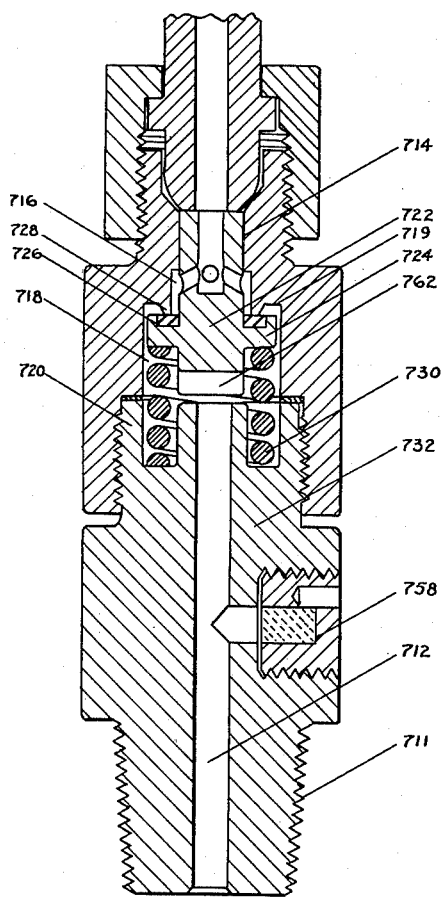
Figure 7 is a vertical section through an alternative construction of a valve, embodying the invention.

Figure 7 illustrates a modification of the valve to accommodate an in-line operation instead of a right angle delivery as so far described and illustrated. In this modification the plug or closure 732, threadaby attached to the valve housing 10 and seating the spring 730, is extended to accommodate the safety member 758, the threaded connection to the supply, and the primary inlet passage 712. The valve housing the body 722 is formed with a single passage 714 having the three enlargements 716, 718, 720, the latter 720, being threaded to accommodate the member 732, which seats the spring 730. The annular rim 728 which is situated on the setback 719 forming the enlargement 718 is adapted to provide a seat for the packing 726 bedded in the body collar 724, thus forming a seal against the passage of liquids, gases, or vapours.

The head or portion of the body 722 facing the inlet port 712 is slotted at 762 to allow passage of liquid, gas, or vapour from the inlet passage 712 into the chamber 718, while the remaining portions of the body and the passages are the same as explained for the angular construction.

Figure 2:
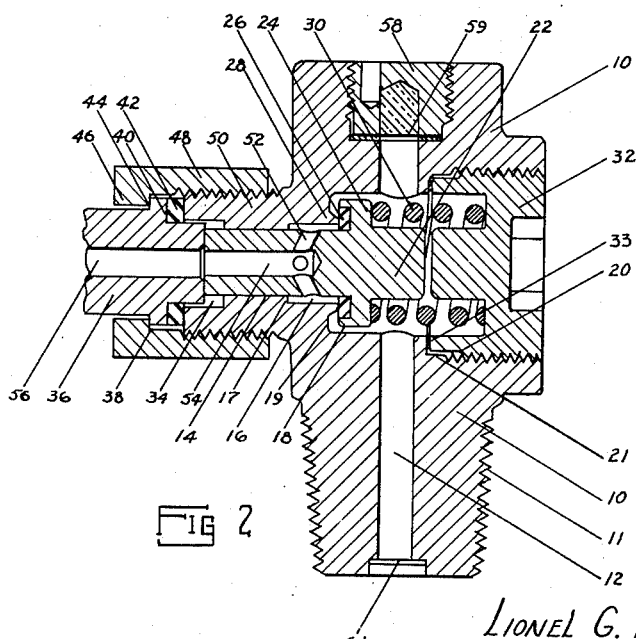
Figure 2 shows a vertical section of the valve in the closed position taken on the center line.

The filter 61 illustrated in the Figures 2 and 4 is omitted in the structure shown in Figure 7 but the passage 712 may be drilled to accommodate one. One method of providing the safety device for this alternative type of valve is illustrated at 758, and although shown to exhaust in a sideways direction, this alternative construction of the valve has been designed, primarily, for use in pressure lines. The line may be laid so that the safety device is aimed in a clear direction.

Operation

In describing the operation of the self-closing valve, it will be assumed that the valve is to be used in conjunction with an oxygen cylinder, and a gauge unit, the gauge unit comprising the component connection as described.

The threaded shank 11 of the valve body 10 is screwed home into the delivery orifice of the cylinder, the body 22 is spring urged into the closed position with the body packing 26 seated on the rim 28, by the force of the spring 30.

The component connection 36 (namely the gauge connection), is placed in the enlargement 34 of the outlet port and the threaded collar 48, which is rotatably fixed to the component connection by the annular collar 38, is threadably connected to the shank 50 of the valve body. The threaded collar 48 which is adapted on its outside periphery to receive a wrench is screwed up until the end of the component connection 36 meets the end of the body 22, the valve still remaining closed. Further turning of the collar 48 exerts a force through the component connection 36 against the valve body 22 sufficient to counteract the closing action of the spring 30, thus opening the valve by unseating the body packing 26 from the rim seat 28.

Some models of component connections may be equipped with wing-like arms extending from the threaded collar 48 to provide a hand grip for turning the collar. In other modifications of the valve, such as the European standard, illustrated in Figure 6, the arms would be fixed to the turnable member 660.

In the operation of filling the cylinder the liquid, gas, or vapour passes from the component connection, through the valve passages, into the cylinder until the desired pressure or quantity is in the cylinder, at which time the collar 48 is turned back through 90° retarding the component connection 36 sufficiently to allow the spring and the force exerted by the liquid gas or vapour in the cylinder acting on the head portion of the body to seat the body packing 26 on the seat 28. Unlike other types of valves, the pressure of the liquid gas or vapour in the cylinder acts upon the valve body to close the valve, thus the higher the pressure in the cylinder the greater the pressure exerted on the body tending to close the valve and prevent leaks.

In controlling the delivery of liquid, gas, or vapour from the cylinder, the collar 48 is turned forward through 90° to unseat the valve body, thus allowing a flow of gas, liquid, or vapour from the cylinder. The turning back of the collar 48 releases the pressure exerted on the body by the component connection and the valve closes by the pressure of the spring and the remaining gas, liquid, or vapour in the cylinder.

Advantages

The advantages of this valve embrace the objects as set forth in the specification in that there are only two moving parts, i. e. the body and the spring. This feature lengthens the life of the valve and makes the valve much cheaper to manufacture, operate, and service, in comparison with the conventional valves now in use which have many movable parts.

This valve has no handwheel, screw stem, diaphragms or stuffing box, thus eliminating many places where leakage may occur, also considerably lowering the initial cost of the valve. The absence of handwheel, screw stem, stuffing box or diaphragms precludes the possibility of any moisture or foreign matter entering the valve and shortening its life or contaminating the gases, vapours, or fluids which the valve is handling.

The opening and closing of this valve is unique in that only a slight turn of component connection is required to quickly and easily move valve body. The force obtainable with the component connection is many times greater than that obtained at present with the conventional handwheel type of valve.

Due to regulations which many industries must adhere to, namely the fitting of a protection cap over the valve, the present valve handwheel is limited to size and diameter. This limited handwheel size plus the fact that it is closing against the pressure contained in the vessels, makes valve operation difficult. This valve when in the closed position utilizes the pressure in the vessel container or piping to keep valve body tight on valve seat, thereby augmenting the spring pressure.

In the preferred structure of this valve the safety member for the first time is placed in a practical position and built into the top of the valve. Thus, when the safety members operate, evacuating the vessel or container, the contents are directed vertically. This action prevents the vessel or container from spinning crazily and also prevents damage to adjacent vessels or containers, thereby avoiding propagation of fire to other cylinders when inflammable gases are involved.

This valve is so designed to permit the installation of a permanent cover, thus saving operational time and protecting valve outlet threads, also removes the possibility of losing covers or caps and shipping tags.

The simplicity of design makes this valve easy to machine and manufacture, and weighing less than present valves, will cost less to make and save on shipping charges.

The positive quick action of this valve is made easy because the force obtainable in foot pounds on the turning member of the component connection is many times greater than the force exerted by the body, and the valve will never stick open or shut. To close the valve no manual force is used to produce a tight seat, the pressure contained in the vessel or piping acting on the specially designed body plus the pressure derived from the spring produces a leak-proof seating no matter what the pressure is in the container vessel or piping.

The valve is quick acting by the fact that to open or close the valve the component connection only travels between 75° and 90° arc to produce these actions.

The quick action is desirable in many industrial uses, especially in the distribution and feeding of medical gases where quick, easy and positive opening is a necessity.

The life of the body and the seating material is greatly lengthened because the body is seated and unseated without rotary motion.

It will be understood that without departing from the spirit of the invention or the scope of the claims, various modifications may be made in the specific expedients described. The latter are illustrative only and not offered in a restrictive sense, it being desired that only such limitations shall be placed thereon as may be required by the state of the prior art.

The sub-titles used throughout the specification are merely to simplify reference thereto and should otherwise be disregarded.

We claim:

1. A stemless high pressure valve, comprising, a casing having a valve chamber therein, an inlet neck extending from the casing in one direction for connection to the top of a pressure cylinder and an outlet extension from the casing extending in a transverse direction to the neck and adapted to form an outlet connection, the neck being provided with an inlet passageway leading to the chamber, the casing and extension being provided with a restricted discharge outlet passageway leading from the chamber, the casing being provided with a safety outlet passageway leading from the chamber, a valve seat in said casing surrounding said outlet passageway, a valve body operable in said chamber against said seat and having a portion guided within the restricted outlet passageway, means normally urging the valve body against the seat, the body having a passageway therethrough for connecting the chamber and the outlet end of the valve when the valve is unseated, and means connected to said outlet extension for actuating the body to open the valve against said means normally urging said body into seated position and against the pressure in the cylinder, and a safety plug in said safety outlet passageway, the outlet passageway and valve chamber extending transversely to the inlet passageway and the safety outlet passageway, whereby when the valve is attached to a pressure cylinder disposed in normally vertical position the inlet passageway and safety outlet passageway extend in an upward direction and the valve chamber and outlet passageway in a sideways direction, the valve being adapted to open by mechanical pressure on the body through said discharge outlet.

2. A valve according to claim 1, wherein the restricted passageway has a widened portion adjacent said chamber, said valve seat is an annular portion of said casing projecting inwardly towards said chamber, said valve body includes a laterally outwardly extending flange, the valve body on the opposite side from said chamber includes a passage leading from its surface to its outlet end thereby to form a communication between the widened portion of said restricted passage and the outlet end.

3. A stemless high pressure valve according to claim 2 wherein the valve body includes a portion extending towards said chamber behind said lateral seating portion, said casing is provided with an access opening wider than said chamber, and there is a plug removably inserted in said opening, said plug includes an annular recess providing a centrally disposed hub registering with the inwardly extending portion of the valve body and said means for urging the valve into seated position is a coil spring housed in said chamber and surrounding said inwardly extending portion of the valve body and the projection on said plug.

4. A valve according to claim 1, wherein the restricted passageway has a widened portion adjacent said chamber, said valve seat is an annular portion of said casing projecting inwardly towards said chamber, said valve body includes a laterally outwardly extending flange, the valve body on the opposite side from said chamber includes a passage leading from its surface to its outlet and thereby to form a communication between the widened portion of said restricted passage and the outlet end, the flange including a recess facing said valve seat and a packing in said recess.

5. A gas-dispensing apparatus, comprising, a cylinder for fluids under high pressure, a valve attached to the top of the cylinder, said valve having a neck engaged in a top opening in the cylinder, and a casing above said neck, including a valve chamber and a valve body operated therein and means normally urging the body into closed position, said casing and neck including a passage leading through the neck of the valve to the chamber, a side outlet in the casing, mechanical means for opening the valve body, a component connection at the side of the valve for conducting fluid from the cylinder to a place of use, a safety outlet passageway leading from the valve chamber to an outlet on the top of the valve, a safety plug in said passageway, a cover for the valve, said cover being adapted to be semi-permanently fixed to the cylinder so as to enclose said valve, an opening in the top of the cover in register with the safety plug and a second opening in the cover adjacent the side outlet.

LIONEL G. DIMITRI.
SAMUEL A. PURVIS.

REFERENCES CITED

The following references are of record in the file of this patent:

UNITED STATES PATENTS

| Number | Name | Date |
| --- | --- | --- |
| 1,264,718 | Wagner | Apr. 30, 1918 |
| 2,172,310 | Thomas | Sept. 5, 1939 |
| 2,372,392 | Pletman | Mar. 27, 1945 |